(12) United States Patent
Jordil et al.

(10) Patent No.: US 8,312,635 B2
(45) Date of Patent: Nov. 20, 2012

(54) MEASURING SYSTEM

(75) Inventors: Pascal Jordil, Ecoteaux (CH);
Benjamin Vullioud, Gollion (CH)

(73) Assignee: TESA SA, Renens (CH)

( * ) Notice: Subject to any disclaimer, the term of this patent is extended or adjusted under 35 U.S.C. 154(b) by 0 days.

(21) Appl. No.: 13/092,033

(22) Filed: Apr. 21, 2011

(65) Prior Publication Data
US 2011/0258868 A1 Oct. 27, 2011

(30) Foreign Application Priority Data

Apr. 26, 2010 (EP) .................................... 10161096

(51) Int. Cl.
*G01B 5/008* (2006.01)

(52) U.S. Cl. ........................................................ 33/503
(58) Field of Classification Search ................... 33/503, 33/502, 556, 559
See application file for complete search history.

(56) References Cited

U.S. PATENT DOCUMENTS

| | | | | |
|---|---|---|---|---|
| 4,888,877 A * | 12/1989 | Enderle et al. | ................... | 33/559 |
| 5,040,306 A * | 8/1991 | McMurtry et al. | ............... | 33/556 |
| 5,088,337 A * | 2/1992 | Bennett | ............................ | 33/572 |
| 5,189,806 A * | 3/1993 | McMurtry et al. | ............... | 33/503 |
| 5,528,505 A | 6/1996 | Granger et al. | | |
| 6,112,423 A * | 9/2000 | Sheehan | ........................ | 33/502 |
| 6,354,012 B1 | 3/2002 | Pettersson | | |
| 7,568,373 B2 * | 8/2009 | McMurtry et al. | ............... | 73/1.81 |
| 7,614,157 B2 * | 11/2009 | Granger | ........................... | 33/503 |
| 7,908,757 B2 * | 3/2011 | Ferrari | ............................. | 33/503 |
| 7,954,250 B2 * | 6/2011 | Crampton | ........................ | 33/503 |
| 8,015,721 B2 * | 9/2011 | Eaton et al. | ..................... | 33/503 |
| 2006/0266100 A1 * | 11/2006 | McMurtry et al. | ........... | 33/558.4 |
| 2009/0139105 A1 * | 6/2009 | Granger | ........................... | 33/503 |
| 2009/0178482 A1 * | 7/2009 | Hough et al. | ................... | 33/503 |
| 2010/0132432 A1 * | 6/2010 | Wallace et al. | ................ | 33/503 |
| 2011/0010957 A1 * | 1/2011 | Gomez et al. | ................... | 33/503 |
| 2011/0192043 A1 * | 8/2011 | Ferrari | ............................. | 33/503 |
| 2011/0258868 A1 * | 10/2011 | Jordil et al. | ..................... | 33/503 |
| 2011/0270570 A1 * | 11/2011 | Jordil et al. | ................... | 702/150 |
| 2011/0283553 A1 * | 11/2011 | Mcfarland et al. | .............. | 33/503 |
| 2012/0047756 A1 * | 3/2012 | Ferrari | ............................. | 33/503 |

FOREIGN PATENT DOCUMENTS

| | | |
|---|---|---|
| EP | 0 938 641 | 9/1999 |
| EP | 1 610 087 | 12/2005 |
| EP | 1 672 309 | 6/2006 |
| EP | 1 975 546 | 10/2008 |

OTHER PUBLICATIONS

European Search Report completed Aug. 11, 2010 in connection with corresponding European Patent Application No. 10161096.2.

* cited by examiner

*Primary Examiner* — Yaritza Guadalupe-McCall
(74) *Attorney, Agent, or Firm* — Maschoff Gilmore & Israelsen

(57) ABSTRACT

An analogue scanning probe with a connector detachably connectable to a movable support of a coordinate measuring system, the scanning probe including a touch at the tip of a stylus pivotally connected to the scanning probe according to a measure axis and a position encoder delivering a measure of the tilt angle of said touch about said measure axis, the scanning probe including one articulation comprised between said connector and said measure axis arranged to allow tilting of the scanning probe or of a part of the probe scanning probe.

14 Claims, 7 Drawing Sheets

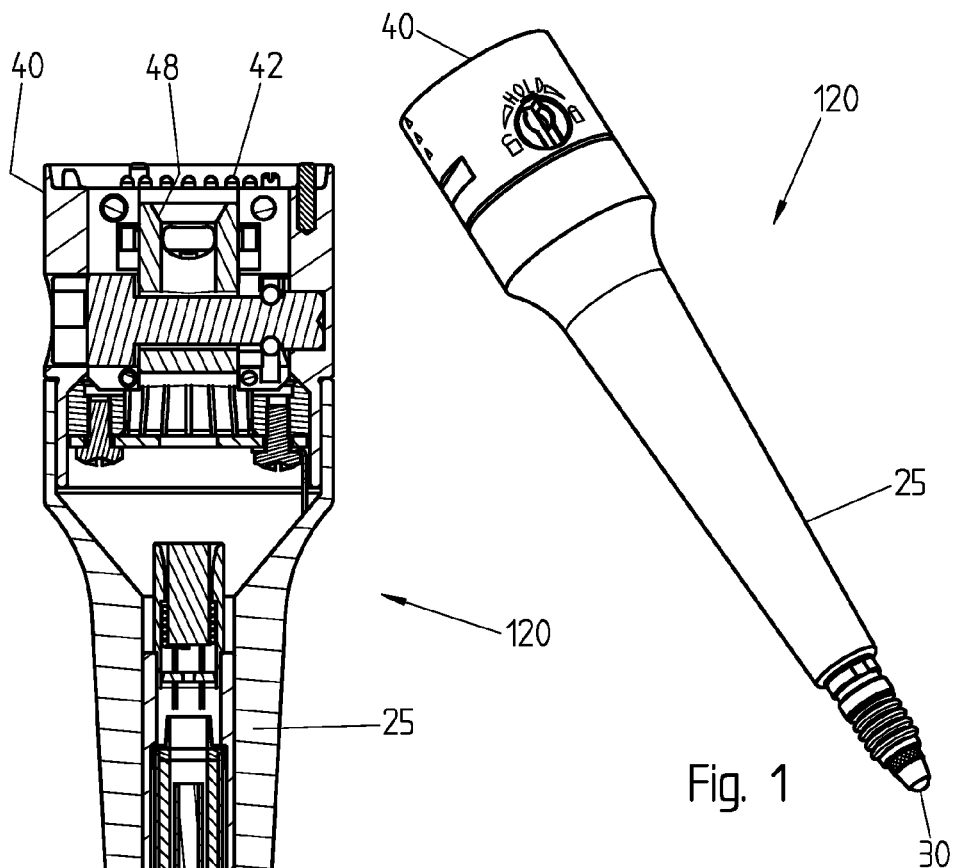
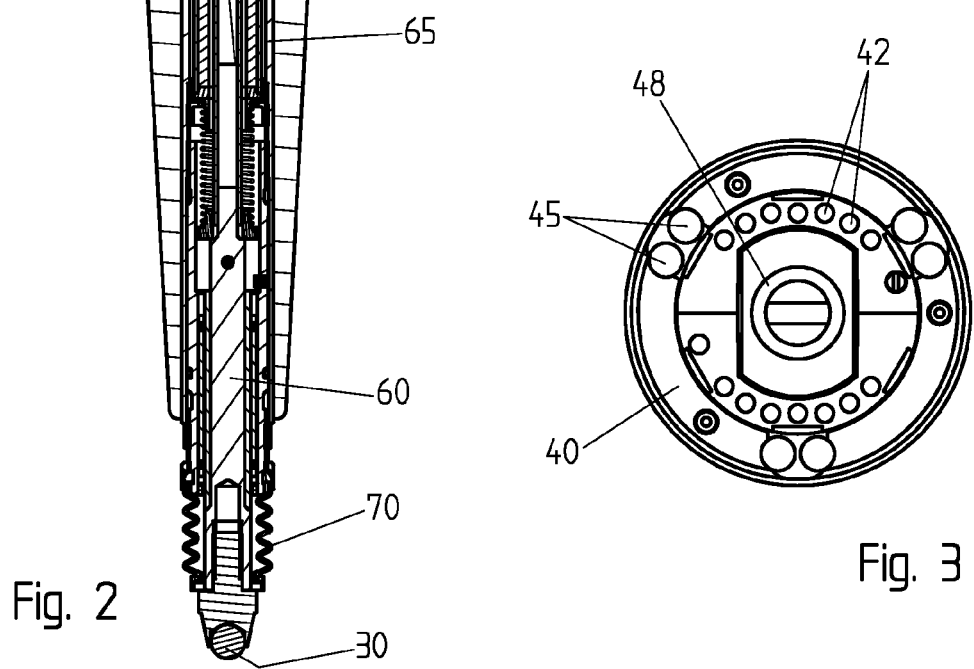
Fig. 1
Fig. 2
Fig. 3

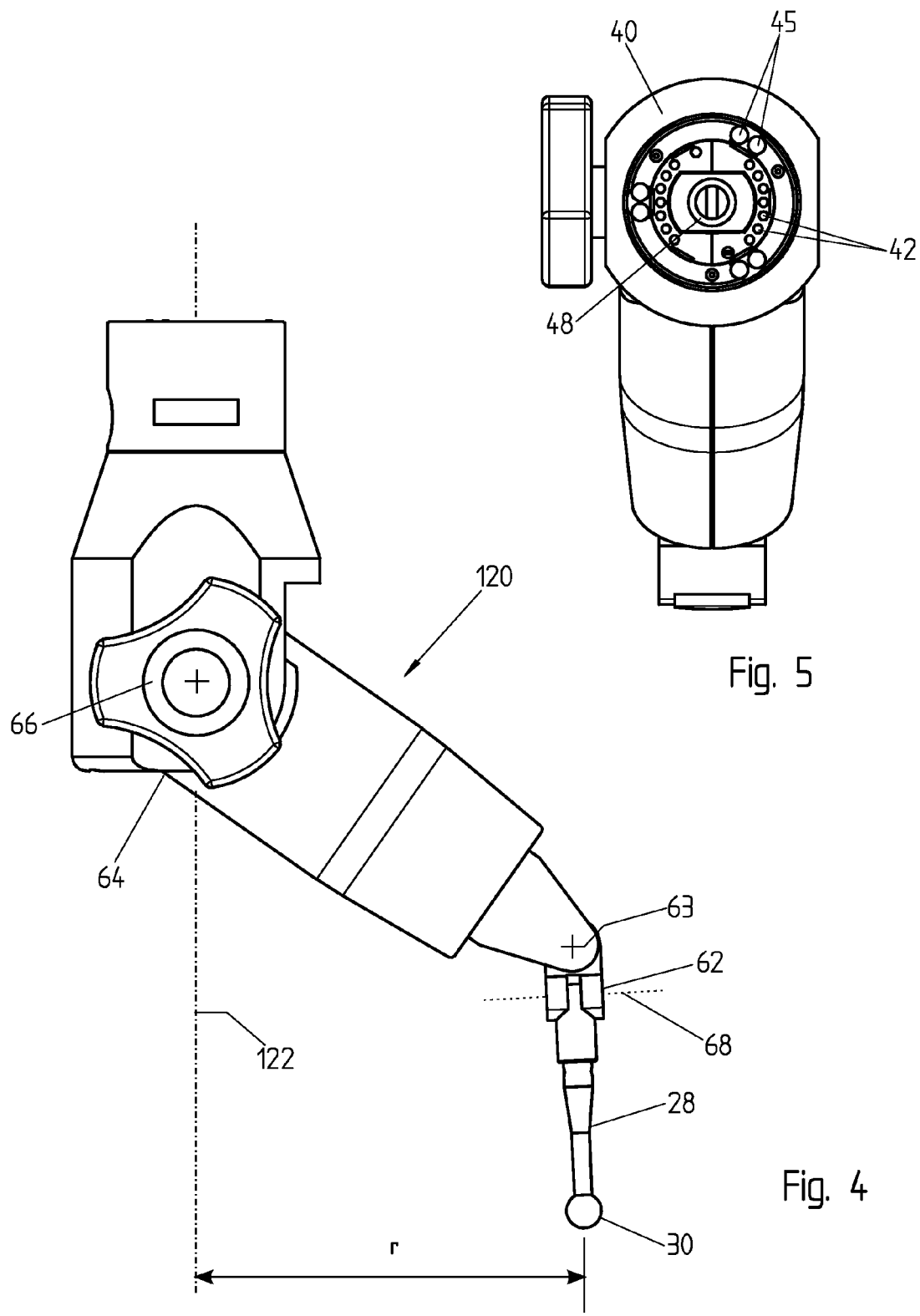

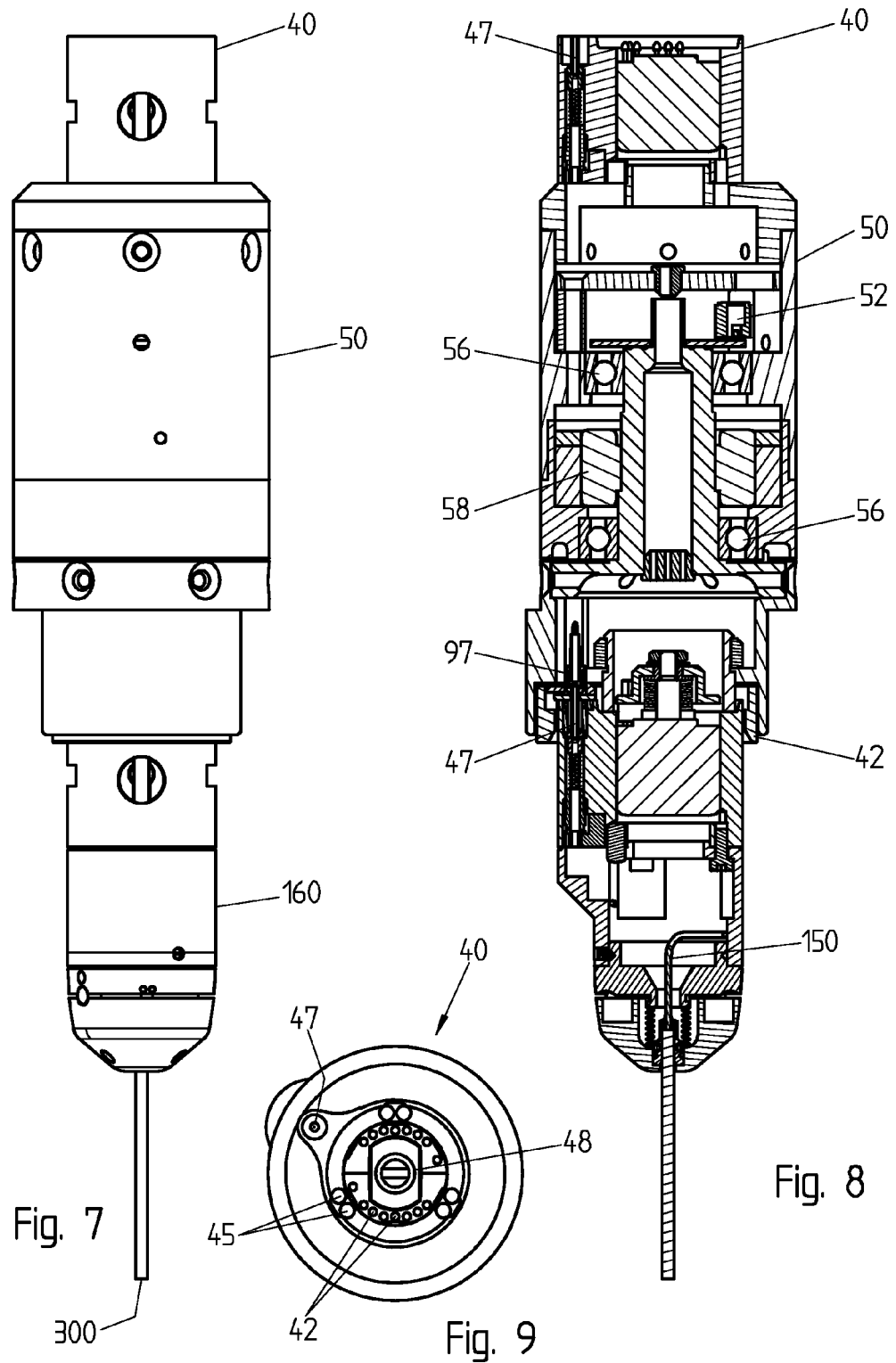

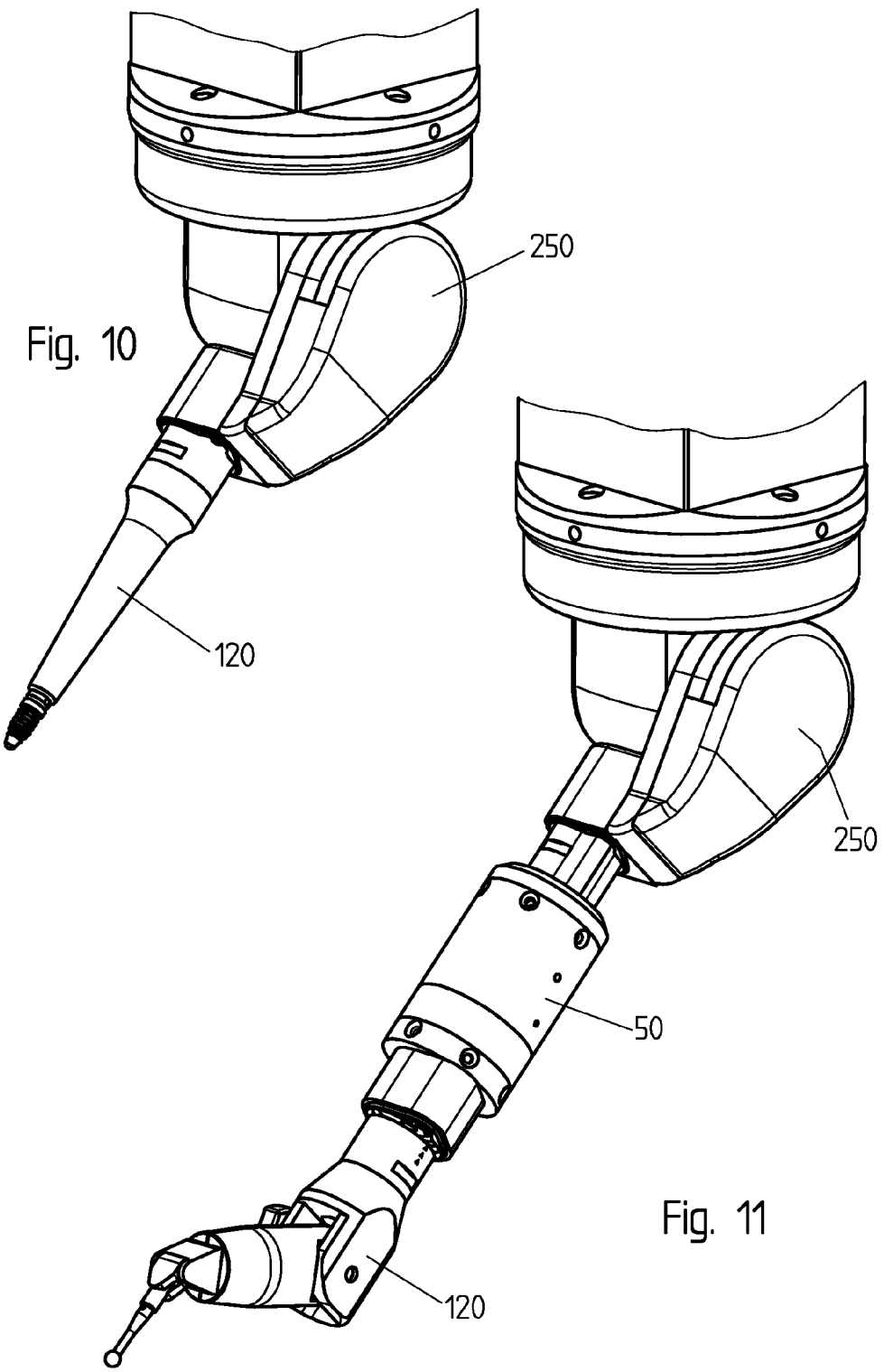

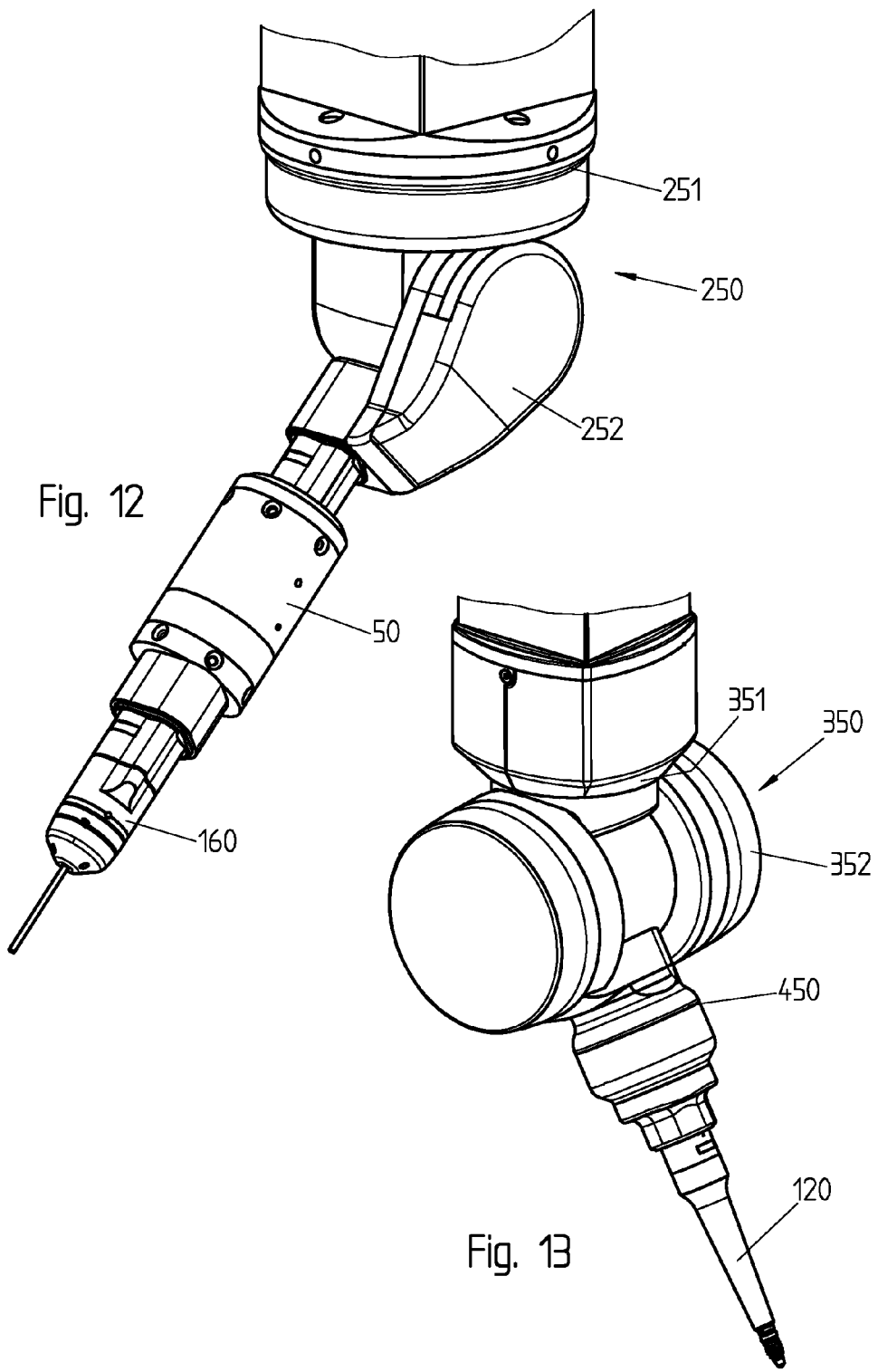

MEASURING SYSTEM

REFERENCE DATA

The present application claims priority of EP10161096.2 filed Apr. 26, 2010, the contents whereof are herein incorporated by reference in their entirety.

FIELD OF THE INVENTION

The embodiments of the present invention are broadly concerned with coordinate measure machines and methods of using coordinate measuring machines. These are devices for measuring coordinates of points at the surface of a workpiece and, for scanning a surface of a workpiece along a scanning path, recording the coordinates of a series of points along the scanning path.

DESCRIPTION OF RELATED ART

Coordinate Measuring Machines (CMM) are used in the art of dimensional metrology and are known in the art. In many cases the CMM comprise a reference surface, for example a rectified granite plane on which the workpieces to be measured can be placed, and a movable support that can be precisely positioned in the three coordinates XYZ by a suitable assembly of linear actuators and encoders. CMMs having this structure are usually designated as "gantry" or "bridge" CMM, and have been described, for example, in patent application EP1975546 and U.S. Pat. No. 5,189,806.

While the "bridge" CMM systems rely mostly on linear degrees of freedom to position the support as required, other known measuring systems use a number of rotational degrees of freedom to position the movable support. Such machines can be found described, for example, in U.S. Pat. Nos. 6,354,012 and 5,528,505.

Variable-orientation bridge CMM systems are also known. These systems include a rotatable head that can turn the movable support, and the coordinate probe attached thereto, for example along one, two, or three orthogonal axes. Examples of such devices can be found, among others, in EP1672309.

The coordinate probe can be a simple touch trigger probe, which determine the instant in time of the contact, as described, for example in EP1610087. In other cases, particularly when the surface is scanned with a probe in continuous contact, it is known to use a probe that determines the amount of deflection of the stylus, for example by an LVDT or strain-gauge sensor, and transmit this deflection to the controller, to be integrated in the coordinate calculation.

Among the optical probes that can be used in CMM are micro-imaging digital systems, which are moved like the mechanical measuring probes, and are aimed at the point whose coordinates are to be measured, instead of touching the material, allowing 3-D coordinate measurements. Laser coordinate probes can likewise be used which are able to determine the coordinate of points on the surface of a measured object as they are illuminated by a scanning laser beam.

Coordinate measuring systems of the prior art have limitations in the maximum scanning speed that can be achieved, without sacrificing coordinate precision. In particular, at high scanning speed, the vibrations generated by masses in rapid oscillatory movement are a source of measuring errors difficult to isolate and quantify from the sampled points.

Another limitation of the known coordinate measuring systems is the need for a large selection of probes, having different dimension and sizes, in order to measure complex pieces. Frequent probe changes slow the measure and reduce the efficiency of the system. Long and massive probes also increase the measuring error and increase the scanning speed at the point of contact.

The number of probes can be reduced by the adoption of complex scanning probes that are sensitive to the deflection along three axes, and motorized rotary heads able to rotate the probe about three independent axes with continuity. These systems, however are relatively expensive and delicate.

Coordinate measuring system having one or more rotational degrees of freedom are known in the art like, among others, EP1975546 that describes a CMM having one or several rotational degrees of freedom capable of continuous rotation, and infinite rotation in both directions. Such high-speed rotating scanning systems allow the acquisition of a large amount of surface data quickly and precisely. Unfortunately, the complexity of the kinematics and the high speed of the probe increase the risk and the consequences of unforeseen crashes of the probe or of the probe support platform in the workpiece under measurement, in particular when the workpieces exhibit large tolerances from their nominal dimensions.

BRIEF SUMMARY OF THE INVENTION

There is therefore a need for a coordinate measuring system which can acquire a large number of coordinate points on a surface of a piece, at high speed, and with reduced vibrations and errors. There is also a need of a measuring probe that is adaptable to complex surfaces, and can be used safely in high-speed rotary CMMs with a lower cost than known multi-axis probes.

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which:

FIG. 1 shows a touch scanning probe with a linear deflection encoder.

FIG. 2 illustrates a section of the probe of FIG. 1

FIG. 3 illustrates a connector for a modular probe.

FIG. 4 shows a swing version of a modular scanning probe.

FIG. 5 is a view of the connector side of the swing probe of FIG. 4.

FIG. 7 illustrates a modular contactless laser scanning probe.

FIG. 8 is a section of the probe of FIG. 7.

FIG. 9 is a top-view of the connector represented in FIG. 7

FIG. 10 shows the linear deflection probe of FIG. 1 mounted on a 2-axis wrist.

FIG. 11 illustrates the inventive devices of FIGS. 4 and 6 on an indexed 2-axis wrist.

FIG. 12 illustrates the inventive devices of FIGS. 7 and 6 on an indexed 2-axis wrist.

FIGS. 13 to 15 show the arrangements of FIGS. 10-12, but with linear continuous 2-axis wrists.

DETAILED DESCRIPTION OF POSSIBLE EMBODIMENTS OF THE INVENTION

Figure 6:
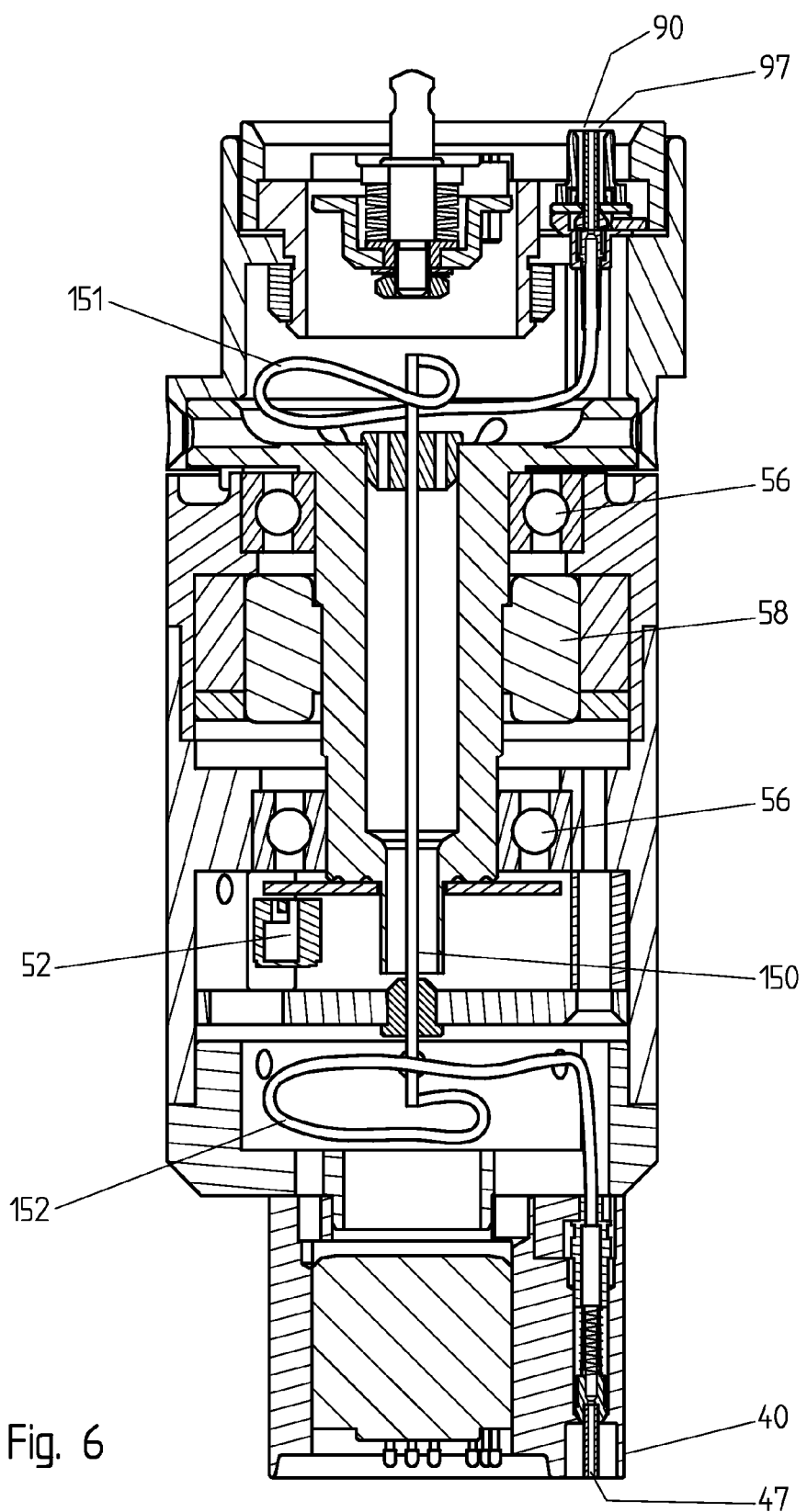
FIG. 6 is a section of a rotating fitting for the probes illustrated on FIGS. 1 and 4.

Some embodiments of the present invention relate to the use of an inductive linear deflection contact probe 120 on an indexed or linear wrist.

A possible structure of the linear inductive probe will now be described with reference to FIGS. 1 to 3. The probe comprises a connector 40 at one side, and an elongated body 25. The function of the connector 40 is to maintain the feeler probe 120 in a precise and repeatable spatial relationship with the measuring machine, and to transmit the required signals between the probe 120 and a suitable probe controller. The probe controller is in general added to the CMM controller, or could, in embodiments, be realized as an independent system. Another function of the connector 40 is to ensure the electrical connections to the probe such as deflection detector and supply power to embedded electronic device for signal processing and information transformation and storage, as it will be seen later.

The probe includes a feeler tip 30, on the opposite end of the connector 40 that is brought into contact relationship with the points of the surface of the object whose coordinates are intended to be measured. The feeler tip 30 includes preferably a ruby sphere, or a sphere of a suitable hard material, whose radius is precisely known. The feeler tip 40 is mounted on a sliding rod 60 that is mounted in the stylus 25, and is capable of sliding along a linear axis, for example an axis aligned with the general symmetry axis of the contact probe 120. The clearance between the stylus 25 and the sliding rod 60 is preferably sealed by a flexible element, like the bellows 70, to prevent the ingress particles or droplets.

The elastic element 61 is used to urge the sliding rod 60 in the fully extended position. During the scan, the CMM obtains or determine a scanning path on the surface of the workpiece, and operates his actuators to bring the feeler tip 30 into contact with the start point of the scanning path and to determine a predefined amount of compression of the spring 61. The CMM is then operated to move the probe 25 maintaining the feeler tip on the scanning path. The linear displacement of the sliding rod 60 relative to the stylus 25 depends continuously from the coordinates of the scanned point, and is read inductively by a linear variable differential transformer (LVDT) 65 and transmitted to the probe controller through the connector 40.

In this embodiment the probe does not include active electronics. The LVDT transducer 65 is connected to the probe controller by a suitable transmission line through the connector 40, for example through coaxial cable or twisted pair. The absence of active electronics, procures simplicity and reliability, which are desirable, but is not essential. The present invention also includes probes with active electronic elements in the probe, for example a signal conditioner, to process and/or amplify the output signal of the position encoder and/or, preferably, to transform it into a digital signal, that can be transmitted to distant units without information loss.

Typically, the measurement range of the linear displacement probe of FIGS. 1-3 is larger than one millimeter, for example four millimeters, and the precision of the transducer, after linearization, is better than ten microns, for example one micron. Preferably, the feeler tip can slide considerably beyond the measurement range without damage, for crash protection, even if the probe is unable to provide high accuracy when the feeler tip is displaced beyond the measurement range. The mechanic deflection range of the feeler tip is preferably sensibly larger than the linear range, for example at least twice or three times bigger than the linear range.

According all kind of probes the measurement range is smaller than the mechanical range. For example with the first probe (FIG. 1) the mechanical range permits to translate the transducer in a large range, but the measurement range is limited by the captor length. By the same the swing version probe (FIG. 4) is able to move in a large mechanical range but the measurement range is only a part of this range. And finally the optical probe (FIG. 7) offers the same, with the focus in a specific range, when it comes out focus, it have a mechanical range before crash and a specific measurement range.

In combination of this aspect and combined for example with a modular rotating fitting the resulting range of measure is smaller than the physical range of measure, due to calibration and linearization lost. By this fact the real range of measure issue from the device with a calibration correction is seen like in the case of a smaller range of measurement. This limitation acts like a filtered range of measure. This changes of measurement range should varies out depends on the device connected together. For example with the rotation vibration we can lost some range to ensure the measure of this vibration is low during the measure. In this case we don't use all the range to grant that fact.

The combination of modular device and modular probe, can be stored a common information memory for calibration and linearization purpose.

According to an aspect of the invention, the probe controller is programmed to correct a non-linearity of the inductive transducer 65, and the probe 120 stores internally individual or combined information that are used for the linearization. In a preferred variant, the probe stores its own individual calibration information, for example like an encoded polynomial function, in a suitable memory. Linearization information is transferred from the probe to the probe controller through the connector 40, preferably using a low wire-count serial bus, for example the "1-wire" serial bus provided by Maxim Integrated Products or the "I$^2$C" bus provided by Philips Electronics.

In alternative, the memory of the probe could contain, in place of the linearization data, a binding information allowing to retrieve the individual linearization information for each probe, for example a serial number of the probe that the probe controller can use as an index to locate the specific calibration tables and linearization data from a suitable database by the probe controller. The communication of the linearization data or of the serial number could also be wireless, for example by a RFID system.

To reduce the number of device talking at the same time or by the same manner, or to orchestrate master-slave communication, the system is able to combine information from multiple configurations and combine modular device together to reduce the complexity of cumulative or independent calibration to compute each time. The result of the combined linearization is stored in one device; the device can store more than one configuration, but just use one active configuration at the same time.

FIG. 3 shows a possible realization of the connector 40. The connector further includes several positioning surfaces 45 arranged in order to ensure a precise and repeatable positioning of the probe. Preferably the positioning surface are arranged to provide six independent points of contact (isostatic connection). The connector 40 comprises moreover electric contacts 42 for the transmission of electrical signals and electric energy between the probe and the movable support transmitting the scanning signals to the CMM, and a locking device 48. EP1577050 describes a modular connector for a touch probe that includes similar features, but other forms of connector are also possible.

According to another embodiment of the invention, illustrated in FIGS. 4 and 5, the probe can be proposed in a swing version, a lever probe is provided, that has a feeler sphere 30 at the end of a swing arm 28, which is pivotally attached to a swing arm support by articulation 63, and an inductive angle encoder to read the angular deflection of the swing arm support. The measurement range of the angle encoder correspond to a part of the allowed swing of the feeler sphere 30 is preferably superior to one millimeter, for example four millimeters, or ±10° in angle, and the precision of the inductive encoder, after linearization, is better than ten microns, for example one micron. The inductive transducer of the swing probe 120 can be individually calibrated with information stored in the probe itself, as for the linear variant. Preferably for crash tolerance, the maximum allowable deflection range of the swing arm is considerably larger than the measure range of the angle encoder, for example larger than at least the double or the triple of the measure range. In a preferred embodiment, the measure axis 63 comprises a friction mechanism in order to ensure a deflection range much larger than the measure range of the angle encoder.

The FIG. 5 illustrates the connector 40 of this variant of the probe.

This embodiment of the invention includes a manually operated articulation 64 to set the probe orientation according to the measurement surface orientation. Preferably the orientation angle of the articulation is known to the probe controller, to compute the appropriate variation of measurement at the probe, taking the inclination of the probe into account. The angle of the articulation can be provided by a suitable encoder, or inferred by the probe controller in a calibration step, by driving the CMM in order to touch a reference body with the feeler 30.

The configuration of FIG. 4 is useful, for example, to scan inner shapes having a rotational symmetry, in particular cylindrical bores, placing the probe inside the volume and rotating to measure variation during the rotation. The axis of rotation of the probe is aligned with the axis of the form to measure, but absolute precision is not required. The articulation 64 is operated to position the touch 30 at a distance r from the rotation axis 122 of the probe that corresponds to the radial dimension of the bores or other features that must be measured. In this manner, the probe of the invention can provide continuous scanning measurements of inner bores measuring deflection in the probe along a single axis, and with a simple rotation of the probe support. Preferably the measure articulation 63 also includes a friction mechanism that permits orienting manually the stylus 28, in order to have it sensibly parallel to the rotation axis 122 after setting the orientation of the articulation 64

The articulation 64 is preferably a friction articulation permits a continuum of angular positions and can be locked or unlocked by the knob 66. In another possible variant, the articulation 64 is indexed, and allows a finite number of pre-set angular positions precisely repeatable and known. In a variant, the articulation is arranged to switch form a position to another under an external torque or force action, and the CMM can be operated to push the swing arm support probe against a suitable tool and thereby set the position of the articulation as wanted. After setting the distance r by changing the inclination of the articulation 62 and/or 63, a recalibration of the probe with a known reference fixture is preferably performed.

Preferably, the probe 120 also includes a safety articulation 62 allowing the tilt of the swing arm 28 about a safety tilt axis 68. It will be appreciated that the safety articulation 62 allows the tilt about an axis that is distinct from the rotation axis sensed by the angle encoder, In the illustrated embodiment of the invention the safety tilt axis and the measurement axis are not parallel, and allow tilting of the swing arm in two different planes respectively, possibly in two orthogonal planes; the safety articulation allows tilt in the direction orthogonal to the plane of measurement, while the angle encoder is sensitive to tilt of the swing arm in the measurement plane. In addition or in alternative, the indexed articulation 63 could also act as safety articulation.

The safety articulation 62, and preferably also the measure articulation 63, includes a friction or other appropriate retaining means to prevent tilt during normal measuring, and allowing to tilt the arm 28 or at least part of the probe 120 when the lateral force exceed a predetermined value, corresponding to a crash. In a variant, the safety function could be provided by a release mechanism, for example a sphere elastically urged into a groove, or similarly.

In a variant, a linear analogue probe, sensitive to the linear displacement of a feeler, like the probe illustrated in FIG. 1, also comprises a safety articulation and/or an indexed articulation. In this case the fault tolerance is enhanced for each possible crash vector. When used in conjunction with a rotatable wrist as illustrated in FIG. 11, two independent rotational degrees of freedom and the linear deflection limits are enough to protect the probe because the case of an axial crash is easily avoidable.

According to an independent aspect represented in FIGS. 1-5 and described above, the invention relates to an analogue scanning probe delivering a deflection measurement along a single axis, linear or angular, and preferably including an inductive transducer and storing internally calibration and linearization information. The analogue scanning probe according to this first aspect preferably comprises a modular connector for interoperation with a coordinate positioning platform.

Another independent inventive aspect concerns a rotating modular fitting 50 that is illustrated in FIG. 6. This additional actuator provides automatic rotation along an axis that, preferably, does not necessary cross the path of the measuring points, (but coincides with the symmetry axis of the probe). The rotating fitting 50 allows rotating the probe while keeping the inertia of the rotating parts to a minimum. This rotatable solution ensures fast and precise scanning with low vibrations.

This rotating modular fitting 50 permits to scan laterally a workpiece with a small error of driving path and to obtain as result a measurement of the workpiece without the need to change the orientation of the whole scanning head in relation with the orientation of surface scanned. The orientation of the probe can be changed quickly and without pulling heavy components in motion, in contrast to the known devices in the prior art. In this invention, the rotation permits to move the support along path parallel to the surface and choose a probe rotation path which intersects the surface at least for a segment of the rotation of the probe with little risk of crashing the scanning head into some obstacle when used with the present invention.

Even in the event of an unforeseen impact, the system of the invention is likely to survive undamaged, because the elements after the rotating fitting that are moving at high speed have low inertia, and are intrinsically crash-tolerant, as it has been explained above. The heavier parts of the system, for example the probe support, are preferably driven along a parallel path well distant from the workpiece surface at a relatively lower speed, and are problematic when an unwanted contact occurs with any obstacle. This system is tolerant to small crashes without real damage, independently to the scanning paths and trajectories, known to the system before the scan but based only on the nominal dimensions of the workpiece.

According to an aspect of the invention, the axes of the CMM and the rotating modular fitting 50 can be driven in rotation in order to increase the sampling density of point measured in special areas of interest, determined in advance or decided automatically in function of the previous measurements. It is conceivable, for example, to have a slow rotation in some parts, to gather coordinates of points of the surface having a given density, and a faster rotation of the probe in other parts, for example in proximity to an edge or another feature of the surface, to gather coordinates of points with a higher density, or carry out specific measurements, for example orientation determination of the surface under measurement.

The rotating fitting has two connectors, 40 and 90 at its both ends, which are interoperable with the connector on the movable support of the CMM and, respectively with the connector on the scanning probes 120. In this way, the rotating fitting 50 can be inserted between the movable support and the probe when it is needed. The upper and lower ends of the rotating fitting 50 can rotate relative to one another thanks to the bearings 56, driven by the electric motor 58. The angle of rotation is read continuously by a suitable angular encoder 52. The commands to drive the motor 58, and the readout of the encoder 52 are communicated to the CMM via the electric contacts of the connector 90. Preferably the rotating fitting comprises a digital processing unit (not represented) arranged to drive the motor 58, measure the angle provided by the encoder 52, and communicate with the probe controller.

FIGS. 7 and 8 illustrate a variant of the system of the invention that includes a contactless optical scanning probe 160. Preferably the probe 160 does not contain optical active elements, but is connected by an optical fiber 150 to an optical probe controller inside a probe module to take advantage to convert the signal to electric Information or externally by the CMM socket transferring the light signal to the controller through optical fibers.

The connectors 40 and 90 are, in this case, equipped with optical ports 47, 97 to transfer the optical signal between the probe and the optical controller in one way or in both ways with single mode or multimode fiber. FIG. 9 represents the connector from above. In a variant the optical controller is included in the modular probe, and the signal transferred wirelessly.

The optical probe 160 has an elongated stylus that carries at its free end a lens 300. The optical probe controller, that may include an interferometer, is equipped to determine a distance between the lens 300 and the piece to be measured. In a preferred variant, the lens 300 is arranged to measure a distance along a direction that is not aligned with the axis of the probe, but is transverse, for example at 90° from the axis. In this way, the rotating fitting 50 can be actuated to scan a surface of a workpiece along a path. In the prior art the probe is used to work only on focalized points, in this invention the optical probe is used with partial focal points. In fact when the focal point is in a not focalized zone, the machine takes both side points at the limit of the focalization to determine the dimension. In fact with the localized rotation of the probe those points permit to draw a complete map of the surface, without following exactly the path ideal to stay in focus with the surface.

FIGS. 6 and 8 illustrate a section of the probe and the rotating fitting. The optical fiber can accommodate the rotation of the motor 52 thanks to the two flexible section of optical fiber 151, 152 wound in spiral above and below the motor itself, and traverse an axial bore in the shaft of the motor. In this way the rotating fitting 50 can turn about an angle larger than 360°, preferably larger than 720° in both directions of rotation, without disrupting the transmission through the optical fiber 150. It was found that this arrangement grants a long life of the fiber despite the repetitive and alternate rotation.

In a variant not represented here, the modular rotating fitting can be combined with one or more additional modular rotating fitting to produce movement with special resulting functions, like sinus or other mathematical function, combining many rotation in the same way and opposite rotation in a sequential manner. It is very interesting for to cumulate acceleration and then create high acceleration needed for some functions with low inertia modules.

The connectors 90 and 40 are connected together by flexible spiral electric conductors, not shown in the figures, in similar way as the optical connectors 97 and 47. The rotating fitting could also, in a variant, be capable of infinite rotation about its axis. In this case, signal and power transmission between the rotating parts is ensured by suitable electric slip rings and optical retransmission devices through a air gap, or a signal converter, or equivalent devices that avoid signal loss.

FIGS. 10-15 show various applications of the measuring system of the invention. In FIG. 10, a linear inductive contact probe is mounted on a rotary indexed head 250, which is connected to a quill 600 of a CMM machine. In this configuration, the quill 600 can be moved along three independent linear coordinates, XYZ, so as to follow a predetermined scanning path with the tip of the scanning probe 120. The indexed head 250 allows setting the orientation of the probe best adapted to the measurement.

FIG. 11 illustrates a swing-arm inductive scanning probe which is mounted on an indexed head 250 similarly to FIG. 10. A rotating fitting 50 is interposed between the probe head 250 and the inductive probe 120. Since the rotating fitting 50 is capable of continuous or reversible rotation, and the measuring feeler does not limit to stay on the rotation axis itself, the system of FIG. 11 has an additional degree of freedom available for the scanning.

FIG. 12 illustrates a scanning system having an additional rotational degree of freedom, equipped with a contactless optical probe 160. The indexed rotary joints 251 and 252 of the head 250 allow setting the orientation of the probe 160 at multiple angle positions and for example with an axial (with or without a small shift from the central axis of the system) or a radial optical probe, the ability to rotate near the surface to detect variation of dimension following a scanning path. This invention permit to scan at a focalized range and determine the dimension too when a part of the scan is out of focalized range based on points obtained both side of the out of focus range. This out of focus is seen like mechanical range versus measuring range which is on focus range.

Figure 14:
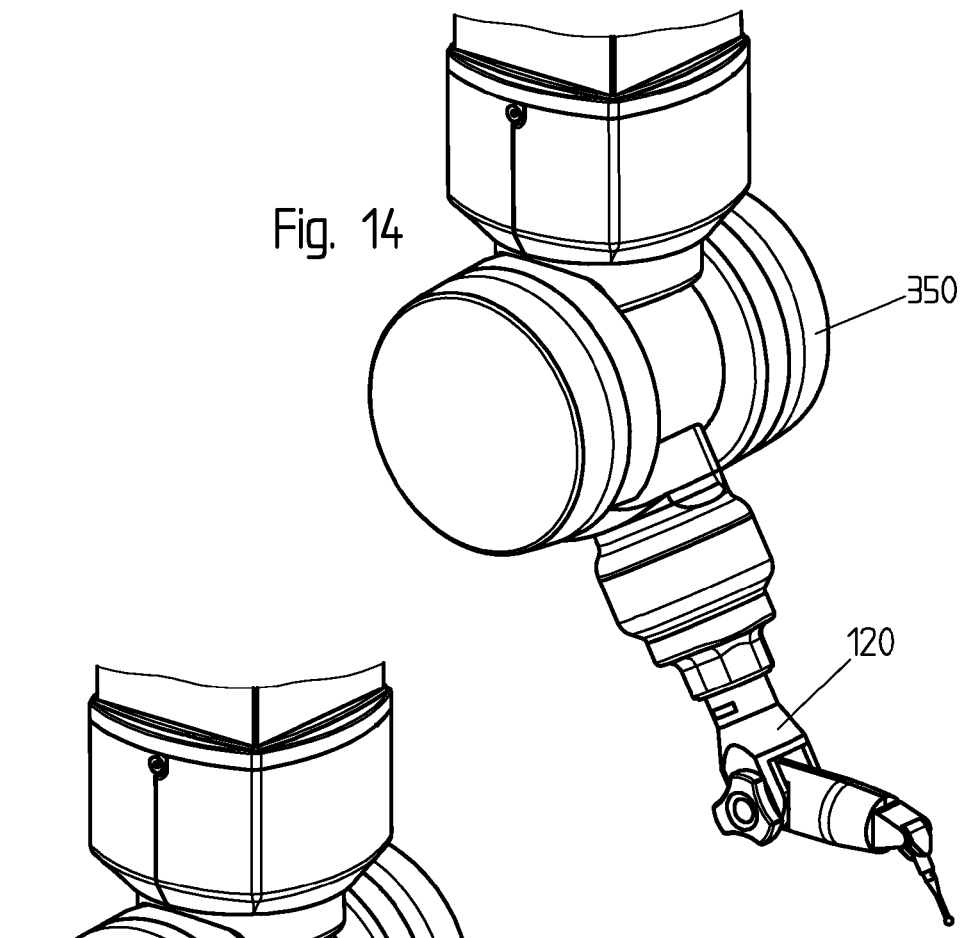
Figure 15:
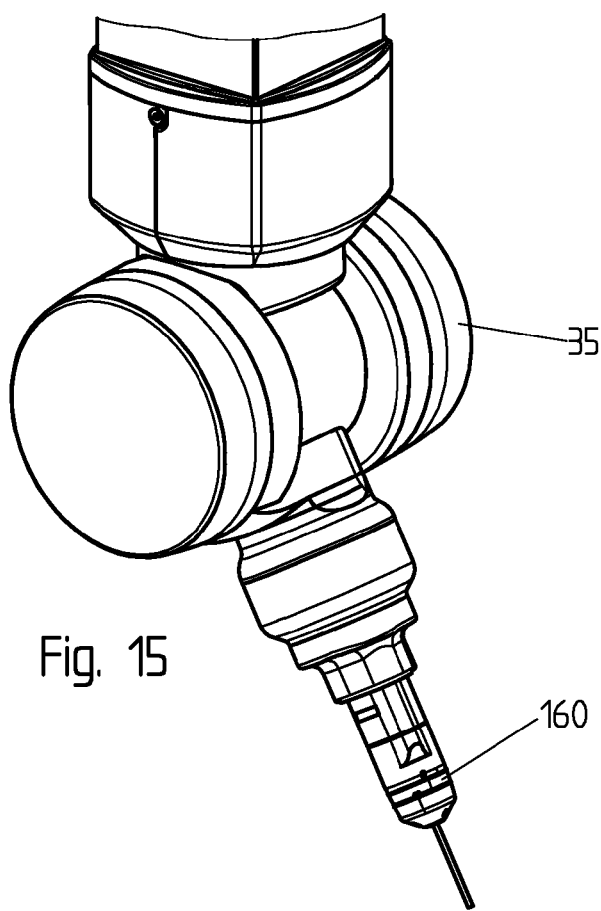

In the variants of FIGS. 13-15, the scanning probe is mounted on a three-axis rotary scanning head 350, yielding a scanning system with six degrees of freedom, three linear coordinates for the motion of the quill 600, and rotation along the three independent rotation axis 351, 352, and 450 of the scanning head 350. According to the needs, the scanning probe can be a contact inductive probe 120, as in FIGS. 13 and 14, or a contactless probe 160, as in FIG. 15. The rotation axis 351, 352, and 450 can be driven to any desired angle by the CMM controller. In this variant the modular rotating fitting can be added to obtain more complex rotations scanning path. All of them crash tolerant with a mechanical range bigger than the measuring range. Mechanical range defines by the probe liberty of movement before reaching its limits and then producing a crash situation. Those crash situations can be easily avoided by this invention, using those new probes.

We claim:

1. An analogue scanning probe, comprising:
   a connector detachably connectable to a movable support of a coordinate measuring system;
   a touch at the tip of a stylus pivotally connected to the scanning probe according to a measure axis and a position encoder delivering a measure of the tilt angle of said touch about said measure axis; and
   one articulation comprised between said connector and said measure axis arranged to allow tilting of the scanning probe or of a part of the probe scanning probe, and in that the connector comprises, several positioning surfaces arranged in order to provide six independent points of contact.

2. The analogue probe of claim 1, in which said articulation is a manually settable friction articulation allowing a continuum of operation positions.

3. The analogue probe of claim 1, further comprising a safety articulation that allows tilting of the stylus about a safety axis when the force exerted on the tough exceeds a determined limit.

4. The analogue probe of claim 3 in which said safety axis lies in a plane not comprising the measure axis or orthogonal to the measure axis.

5. The analogue probe of claim 3, in which said safety articulation is between said measure axis and said touch.

6. The analogue probe of claim 3, in which said measure axis includes a friction means allowing the stylus to be positioned in a angular range larger than is a measure range of said encoder.

7. The analogue probe of claim 1, further comprising a memory storing individual calibration data of the analogue probe.

8. A method of scanning a workpiece with a coordinate measuring system, comprising the following steps:
   connecting a analogue scanning probe to a rotatable support of a coordinate measuring system, the scanning probe including a touch at the tip of a stylus pivotally connected to the scanning probe according to a measure axis and a position encoder delivering a measure of the tilt angle of said touch about said measure axis, and one articulation comprised between said movable support and said measure axis;
   manually operating said articulation to position the touch at a determined distance to rotation axis of said rotatable support;
   driving the coordinate measuring system to align the movable support with an axis of a feature of said workpiece and bring the touch in contact with the surface of the workpiece; and
   rotating the analogue scanning probe by said rotatable support maintaining contact between the touch and the workpiece surface and read the angle measured by the position encoder.

9. The method of claim 8, including a step of calibrating the analogue scanning probe after the step of operating said articulation.

10. The method of claim 8 including a step of determining said distance of the touch to said rotatable support depending on nominal dimensions of said feature.

11. An analogue scanning probe, comprising:
   a connector detachably connectable to a movable support of a coordinate measuring system;
   a touch at the tip of a stylus pivotally connected to the scanning probe according to a measure axis and a position encoder delivering a measure of the tilt angle of said touch about said measure axis;
   one articulation comprised between said connector and said measure axis arranged to allow tilting of the scanning probe or of a part of the probe scanning probe;
   and a safety articulation that allows tilting of the stylus about a safety axis when the force exerted on the tough exceeds a determined limit.

12. The analogue probe of the claim 11 in which said safety axis lies in a plane not comprising the measure axis or orthogonal to the measure axis.

13. The analogue probe of claim 11, in which said safety articulation is between said measure axis and said touch.

14. The analogue probe of claim 11, in which said measure axis includes a friction means allowing the stylus to be positioned in a angular range larger than is a measure range of said encoder.

* * * * *